United States Patent
Hotta (10) Patent No.: US 9,624,865 B2
(45) Date of Patent: Apr. 18, 2017

(54) CONTROL METHOD OF INTERNAL COMBUSTION ENGINE

(71) Applicant: Toyota Jidosha Kabushiki Kaisha, Toyota-shi, Aichi-ken (JP)

(72) Inventor: Shintaro Hotta, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 106 days.

(21) Appl. No.: 14/825,521

(22) Filed: Aug. 13, 2015

(65) Prior Publication Data

US 2016/0061140 A1 Mar. 3, 2016

(30) Foreign Application Priority Data

Aug. 27, 2014 (JP) .................................. 2014-172598

(51) Int. Cl.
*F02D 41/30* (2006.01)
*F02D 41/10* (2006.01)
(Continued)

(52) U.S. Cl.
CPC ..... *F02D 41/3094* (2013.01); *F02D 13/0261* (2013.01); *F02D 13/0276* (2013.01);
(Continued)

(58) Field of Classification Search
CPC ............... F02D 41/3094; F02D 41/102; F02D 41/0077; F02D 41/0007; F02D 41/005; F02D 41/105; F02D 41/36; F02D 41/365; F02D 41/3818; F02D 41/18; F02D 41/0052; F02D 41/402; F02D 21/08;
(Continued)

(56) References Cited

U.S. PATENT DOCUMENTS

2005/0155344 A1* 7/2005 Kobayashi ................ F02B 1/12
60/286
2005/0199218 A1* 9/2005 Hashima ............. F02D 41/3029
123/431
(Continued)

FOREIGN PATENT DOCUMENTS

JP H05-171990 A 7/1993
JP 2010-053717 A 3/2010

*Primary Examiner* — Thomas Moulis
*Assistant Examiner* — George Jin
(74) *Attorney, Agent, or Firm* — Dinsmore & Shohl LLP (57) ABSTRACT

A control method takes an internal combustion engine including a port injection valve that injects fuel into an intake port and a cylinder injection valve that directly injects fuel into a combustion chamber as a control target. In the control method, when request torque to the internal combustion engine is in a first torque range, lean combustion is realized by port asynchronous injection. When the request torque is increased from the first torque range to a second torque range which is higher than the first torque range, fuel injection is switched to port synchronous injection from port asynchronous injection, and lean combustion is realized by the port synchronous injection. When the request torque is increased from the second torque range to a third torque range that is higher than the second torque range, the port synchronous injection is stopped, and lean combustion is realize by cylinder injection.

6 Claims, 6 Drawing Sheets

(51) Int. Cl.
  *F02D 41/00* (2006.01)
  *F02D 13/02* (2006.01)
  *F02D 21/08* (2006.01)
  *F02M 69/04* (2006.01)

(52) U.S. Cl.
  CPC ........... *F02D 21/08* (2013.01); *F02D 41/005* (2013.01); *F02D 41/0007* (2013.01); *F02D 41/105* (2013.01); *F02D 2041/001* (2013.01); *F02M 69/046* (2013.01); *Y02T 10/144* (2013.01); *Y02T 10/18* (2013.01); *Y02T 10/47* (2013.01)

(58) Field of Classification Search
  CPC ........... F02D 13/0276; F02D 2041/001; F02D 2041/0017; F02M 69/046; Y02T 10/144; Y02T 10/47
  USPC .................. 123/76, 431, 492, 299, 300, 304
  See application file for complete search history.

(56) References Cited

U.S. PATENT DOCUMENTS

| | | | |
|---|---|---|---|
| 2006/0201152 A1* | 9/2006 | Irisawa | F02D 13/0226 60/605.1 |
| 2008/0041044 A1* | 2/2008 | Tanaka | B01D 53/9495 60/301 |
| 2010/0132661 A1* | 6/2010 | Klein | F02D 19/081 123/299 |
| 2014/0297162 A1* | 10/2014 | Surnilla | F02D 41/3094 701/104 |

* cited by examiner

CONTROL METHOD OF INTERNAL COMBUSTION ENGINE

FIELD OF THE INVENTION

Preferred embodiments relate to a control method of an internal combustion engine, and more particularly, an internal combustion engine including a port injection valve and a cylinder injection valve.

BACKGROUND ART

There is known an internal combustion engine including a port injection valve that injects fuel into an intake port, and a cylinder injection valve that directly injects fuel into a combustion chamber. The internal combustion engines are typically spark ignition type internal combustion engines, and include various modes of internal combustion engines that are equipped with a turbocharger, of a natural aspiration type, equipped with an EGR device and the like.

Japanese Patent Laid-Open No. 2010-053717 (hereinafter referred to as "Patent Literature 1") discloses a control method of an internal combustion engine equipped with a turbocharger, which includes a port injection valve and a cylinder injection valve. According to the control method disclosed in Patent Literature 1, an operation by combustion by a theoretical air-fuel ratio (hereinafter, stoichiometric combustion) is performed in all operation ranges, by properly using an operation using only port injection by the port injection valve, an operation using only cylinder injection by the cylinder injection valve, and an operation using port injection and cylinder injection in combination, in accordance with an operation range which is determined by torque and a speed of the internal combustion engine. Performing an operation by stoichiometric combustion in the all operation ranges is one of the methods for enhancing emission performance.

SUMMARY OF THE INVENTION

From the viewpoint of fuel efficiency performance, an operation by combustion by the air-fuel ratio with leaner fuel than the theoretical air fuel ratio (hereinafter, lean combustion) is preferable. Emission performance can be assured by exhaust gas treatment equipment, and therefore, in order to enhance fuel efficiency performance more, enlarging the operation range by lean combustion is investigated today.

Lean combustion mainly includes lean combustion that can be realized by port injection, and lean combustion that can be realized by cylinder injection. From the viewpoint of emission performance, lean combustion by port injection is basically preferable, which can realize combustion without unevenness by mixing fuel and air more uniformly.

However, depending on operation ranges, lean combustion with use of cylinder injection is sometimes more preferable than lean combustion with use of port injection. A specific example thereof is a high torque range. In the high torque range, valve timing of an intake vale is advanced to enhance intake efficiency, and with this, a valve overlap amount between the intake valve and an exhaust valve is increased. Valve overlap in a high torque range sometimes causes blow-by of air to an exhaust port from an intake port (so-called scavenge). In particular, in an internal combustion engine equipped with a turbocharger, occurrence of scavenge is remarkable by the intake pressure being enhanced by turbocharging. When scavenge occurs, part of the fuel in the intake port flows to the exhaust port together with air. Outflow of unburned fuel to the exhaust port worsens both fuel efficiency performance and emission performance. However, if an operation by lean combustion using cylinder injection is performed, fuel is directly injected into the combustion chamber by the cylinder injection vale, and therefore, outflow of unburned fuel to the exhaust port by scavenge can be prevented.

As above, if an operation by lean combustion is to be performed extensively in a wide operation range, it is desirable to perform an operation by lean combustion using port injection basically, and switch the operation to an operation by lean combustion using cylinder injection in a high torque range. However, concerning emission performance at the time of the switch, there is the matter to be noted which will be described as follows.

When port injection is performed, liquid fuel adheres to the back surface of an umbrella-shaped portion of the intake value, and a wall surface of the intake port. The liquid fuel adhering to the wall surface of the intake port and the like is called port-wet. In the internal combustion engine which performs port injection, air-fuel control is generally performed by considering the fuel which is injected from the port injection valve and is directly vaporized in the intake port, and the fuel which is vaporized from port-wet (for example, calculation of the fuel injection amount is performed with use of a known fuel model).

When cylinder injection is performed, port-wet does not adhere because fuel is directly injected into the combustion chamber. However, when switch to cylinder injection from port injection is performed, gaseous or atomized fuel is generated from the port-wet which adheres at the time of execution of port injection, and the gaseous or atomized fuel flows into the combustion chamber even after the switch to the cylinder injection. A set air-fuel ratio at the time of a lean operation is set to a leaner side than an air-fuel ratio with which the generation amount of NOx increases. However, the fuel which is generated from port-wet and flows into the combustion chamber makes the air-fuel ratio in the combustion chamber richer than the set air-fuel ratio, and thereby increases the generation amount of NOx. Unlike the case of the port-wet which is generated regularly at the time of port injection, the amount of the fuel which is derived from the port-wet and flows into the combustion chamber transitionally after the switch to cylinder injection is difficult to estimate accurately. Therefore, it is not easy to compensate a fluctuation of the air-fuel ratio by the influence of the port-wet by air-fuel ratio control.

As described above, from the viewpoint of emission performance, it is preferable to realize lean combustion by uniform mixture of fuel and air, so-called uniform lean combustion. However, in this case, emission performance is reduced by a slight fluctuation of the air-fuel ratio, and therefore, there is a limit to performing the operation by uniform lean combustion extensively in a wide operation range.

Preferred embodiments are conceived based on study on the above described matter, and have an object to provide a control method of an internal combustion engine which enables an operation by lean combustion to be performed extensively in a wide operation range while restraining reduction in emission performance when controlling an internal combustion engine including a port injection valve that injects fuel to an intake port and a cylinder injection valve that directly injects fuel into a combustion chamber.

A control method of an internal combustion engine according to preferred embodiments is a method that takes an internal combustion engine including a port injection valve that injects fuel to an intake port, and a cylinder injection valve that directly injects fuel into a combustion chamber as a control target. The control method causes the internal combustion engine to selectively execute port asynchronous injection, port synchronous injection and cylinder injection. Here, in the present application, "port asynchronous injection" is defined as fuel injection by the port injection valve, which starts while an intake valve is closed and ends before the intake valve opens. Further, "port synchronous injection" is defined as fuel injection by the port injection valve, which starts while the intake valve is closed and ends while the intake valve opens. That is to say, "synchronous" in the present application means that a fuel injection time period overlaps at least partly an opening time period of the intake valve. Further, "cylinder injection" is defined as fuel injection by the cylinder injection valve.

The control method realizes lean combustion by port asynchronous injection, when request torque to the internal combustion engine is in a first torque range. According to port asynchronous injection, fuel is injected into the intake port while the intake valve is closed. Therefore, the fuel can be supplied into the combustion chamber after the fuel is sufficiently vaporized in the intake port, and homogeneity of a mixture gas in the combustion chamber can be enhanced. By enhancing homogeneity, unevenness in combustion is eliminated, and a generation amount of NOx can be restrained. In this step, injection of the fuel by the cylinder injection valve may be prohibited or may be allowed. However, injection of the fuel by the cylinder injection valve is allowed only within a range in which the fuel that is supplied into the combustion chamber by the cylinder injection can assure homogeneity of the mixture gas in the combustion chamber.

When the request torque increases from the first torque range to a second torque range that is higher than the first torque range, the control method switches fuel injection to port synchronous injection from port asynchronous injection. Lean combustion by port synchronous injection is inferior in homogeneity as compared with lean combustion by port asynchronous injection, but can realize lean combustion with higher homogeneity as compared with lean combustion by cylinder injection. Further, according to port synchronous injection, part of fuel is injected when the intake valve opens, and the fuel flows into the combustion chamber together with intake air. As a result, when compared by using the same fuel injection amount, an amount of port-wet becomes smaller than at the time of execution of port asynchronous injection. The control method also continues an operation by lean combustion after the switch to port synchronous injection from port asynchronous injection, and realizes lean combustion by port synchronous injection. In this step, injection of the fuel by the cylinder injection valve may be prohibited, or may be allowed within the range in which homogeneity of the mixture gas in the combustion chamber can be assured.

In the step of realizing lean combustion by port synchronous injection, a ratio of a fuel injection amount in a time period in which the intake valve is closed and a fuel injection amount in a time period in which the intake valve opens may be changed according to the request torque. Preferably, in response to increase of the request torque, the time period of the fuel injection by the port injection valve which is performed while the intake valve is closed is decreased, and the time period of the fuel injection by the port injection valve which is performed while the intake valve opens is increased. By performing control like this, port-wet can be gradually decreased even after fuel injection is switched to port synchronous injection from port asynchronous injection.

Further, in the step of realizing lean combustion by port synchronous injection, injection of the fuel by the cylinder injection valve may be allowed, and a ratio of the fuel injection by the cylinder injection may be gradually increased in response to increase of the request torque. This is because as the torque increases, the combustion temperature increases, and the cylinder injection valve is exposed a thermally severe environment. If fuel injection by the cylinder injection valve is performed, a tip end of the cylinder injection valve can be cooled by the fuel which has a relatively low temperature. However, the ratio of the fuel injection by cylinder injection is limited to be within a range that can keep lean combustion with high homogeneity.

When the request torque increases from the second torque range to a third torque range that is higher than the second torque range, the control method stops port synchronous injection, and realizes lean combustion by cylinder injection. If fuel injection is directly switched to cylinder injection from port asynchronous injection, a large amount of port-wet is generated at the time of execution of port asynchronous injection, and therefore, fuel that is generated from the port-wet also continues to flow into the combustion chamber even after the switch, and causes fluctuation in the air-fuel ratio. However, the control method switches fuel injection to port synchronous injection with a small amount of port-wet from port asynchronous injection, and after reducing port-wet, switches the combustion to lean combustion by cylinder injection. Therefore, fluctuation in the air-fuel ratio directly after the fuel injection is switched to cylinder injection is restrained.

Setting of the respective first torque range, second torque range and third torque range to be the references of switch of the mode of fuel injection can be determined based on various conditions such as a mechanical structure, a component material, control characteristics and the like of the internal combustion engine. In particular, when the internal combustion engine is an internal combustion engine equipped with a turbocharger, a region where an intake pipe pressure of the internal combustion engine is equal to or lower than atmospheric pressure may be defined as the first torque range, and a region where the intake pipe pressure is higher than the atmospheric pressure may be defined as the second torque range. In this case, the control method switches fuel injection to port synchronous injection from port asynchronous injection in response to the intake pipe pressure of the internal combustion engine becoming higher than the atmospheric pressure with increase of the request torque, and realizes lean combustion by port synchronous injection.

Further, the control method preferably advances valve timing of the intake valve in response to increase of the request torque, and increases an overlap amount between the intake valve and the exhaust valve. When the internal combustion engine is an internal combustion engine equipped with a turbocharger, overlap causes scavenge in a turbocharging range. As the overlap amount becomes larger, the amount of air which blows to the exhaust port (hereinafter, the scavenge amount) becomes larger, and when the scavenge amount becomes large, blow-by of the fuel also occurs. Therefore, a region where the scavenge amount which is estimate based on the overlap amount is equal to or smaller than a predetermined reference value may be defined as the second torque range, and a region where the scavenge amount is larger than the reference value may be defined as the third torque range. In this case, the control method stops port synchronous injection in response to the scavenge amount becoming larger than the reference value with increase of the request torque, and realizes lean combustion by cylinder injection.

Further, when the internal combustion engine is an internal combustion engine equipped with an EGR device, the control method preferably starts introduction of an EGR gas into the intake passage by an EGR device while realizing lean combustion by port synchronous injection. There is a time delay until an EGR amount in the combustion chamber reaches a required amount from the start of introduction of the EGR gas into the intake passage. However, by starting introduction of the EGR gas at the stage of port synchronous injection, insufficiency of the EGR gas amount can be prevented at the time point when the port synchronous injection is stopped and the combustion is switched to lean combustion by the cylinder injection. The control method continues introduction of the EGR gas while realizing lean combustion by cylinder injection. Lean combustion by cylinder injection is lower in homogeneity of the mixture gas as compared with lean combustion by port injection, and easily generates NOx at the time of combustion, but generation of NOx can be restrained by introduction of the EGR gas.

According to the control method according to preferred embodiments, when the request torque increases under the situation where lean combustion by port asynchronous injection is performed, the combustion is temporarily switched to lean combustion by port synchronous injection, and thereafter is switched to lean combustion by cylinder injection, whereby the operation by lean combustion can be performed extensively in a wide operation range while reduction in emission performance is restrained.

DETAILED DESCRIPTION OF THE PREFERRED EMBODIMENTS

First Embodiment

Hereinafter, a first embodiment of the present invention will be described with use of the drawings.

Figure 1:
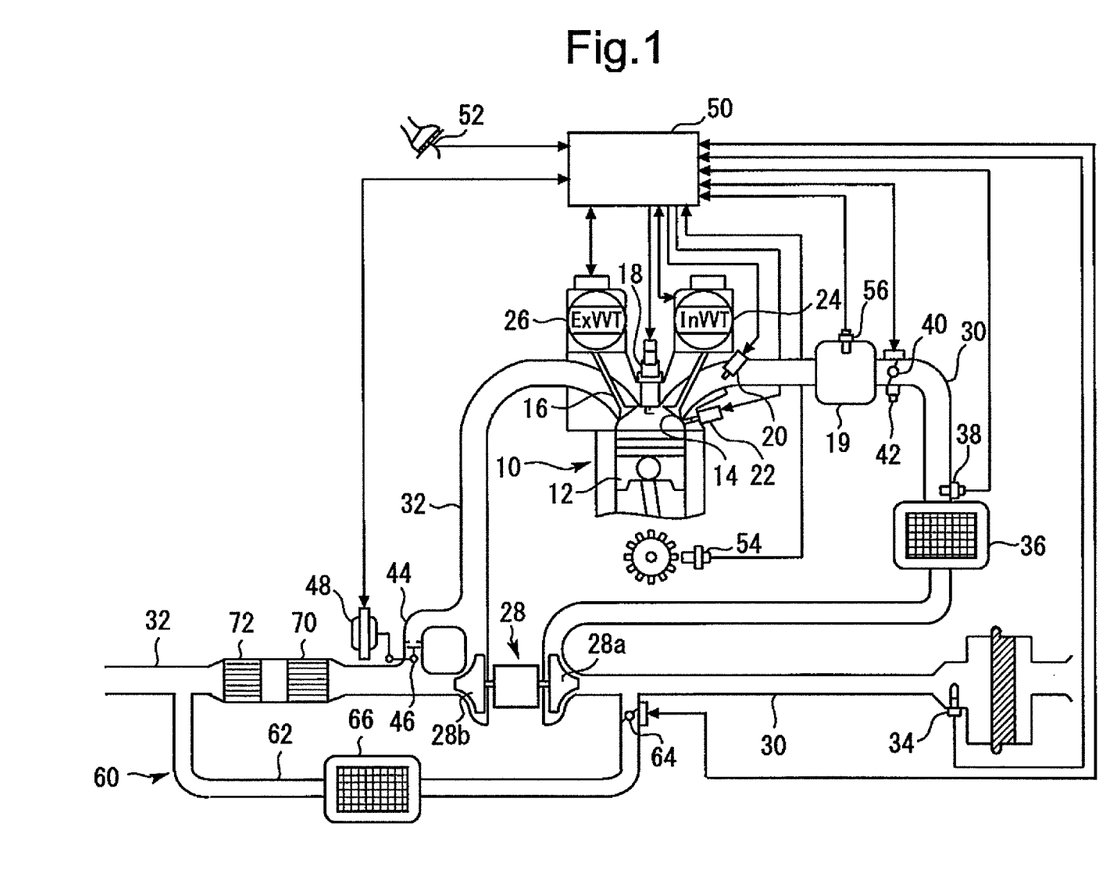
FIG. 1 is a diagram showing a configuration of a system according to a first embodiment of the present invention.

FIG. 1 is a diagram showing a configuration of a system according to the first embodiment. The system according to the present embodiment includes an internal combustion engine (hereinafter, simply called an engine) 10 which is mounted on an automobile as motor. The engine 10 includes a plurality of cylinders, and each of the cylinders of the engine 10 is provided with a piston 12, an intake valve 14, an exhaust valve 16, an ignition plug 18, a port injection valve 20 that injects fuel into an intake port, and a cylinder injection valve 22 that directly injects fuel into the cylinder (that is, into a combustion chamber).

In the illustrated configuration, the engine 10 is provided with a variable intake valve mechanism 24 that makes valve opening characteristics of the intake valve 14 variable, and a variable exhaust valve mechanism 26 that makes valve opening characteristics of the exhaust valve 16 variable. A known valve mechanism that makes at least one of valve timing, a valve lift amount and a working angle variable can be applied to each of these variable valve mechanisms.

The engine 10 has a turbocharger 28. The turbocharger 28 has a compressor 28a and a turbine 28b. The compressor 28a is disposed halfway through an intake passage 30, and the turbine 28b is disposed halfway through an exhaust passage 32. A three-way catalyst 70 and a NOx purifying catalyst 72 are provided in the exhaust passage 32 at a downstream side from the turbine 28b.

An air flow meter 34 for measuring an intake air amount is installed in the intake passage 30 at an upstream side from the compressor 28a. An intercooler 36 which cools intake air that is compressed by the compressor 28a is installed at a downstream side of the compressor 28a. A turbocharging pressure sensor 38 for measuring turbocharging pressure is installed at a downstream side of the intercooler 36. An electronically controlled throttle valve 40 for regulating an intake air amount is installed at a downstream side of the turbocharging pressure sensor 38. A throttle position sensor 42 for measuring an opening degree of the throttle valve 40 is installed in a vicinity of the throttle valve 40. A surge tank 19 is formed in the intake passage 30 at a downstream side from the throttle valve 40. An intake pipe pressure sensor 56 for measuring an intake pipe pressure is installed in the surge tank 19.

A bypass passage 44 which bypasses an upstream side and a downstream side of the turbine 28b is provided in a vicinity of the turbine 28b. A wastegate valve 46 is installed in the bypass passage 44. When the wastegate valve 46 is opened, part of an exhaust gas flows by passing through the bypass passage 44 without passing through the turbine 28b. The wastegate valve 46 is driven by an actuator 48, and an opening degree of the wastegate valve 46 is electronically controlled.

Further, the engine 10 has an EGR device 60 that recirculates part of the exhaust gas to the intake passage 30 from the exhaust passage 32. The EGR device 60 includes an EGR passage 62, an EGR cooler 66 and an EGR valve 64. The EGR passage 62 is a passage for taking out part of the exhaust gas as an EGR gas, and connects the exhaust passage 32 at a downstream side from the catalysts 70 and 72 and the intake passage 30 at an upstream side from the compressor 28a. The EGR cooler 66 is installed in the EGR passage 62, and cools the EGR gas which flows in the EGR passage 62. The EGR valve 64 is installed in a vicinity of an outlet of the EGR passage 62, and is used for regulation of an amount of the EGR gas which is introduced into the intake passage 30.

Further, the system has an accelerator position sensor 52 for measuring an accelerator pedal depressing amount (that is "an accelerator opening degree"), and a crank angle sensor 54 for measuring a crank angle of the engine 10.

The aforementioned various sensors and actuators are electrically connected to the control device 50. The control device 50 is an ECU (Electronic Control Unit). The control device 50 controls the engine 10 by operating the respective actuators based on signals from the respective sensors. More specifically, the control device 50 calculates request torque in response to the accelerator pedal depressing amount first. Subsequently, the control device 50 determines an operation mode of the engine 10 based on the request torque and the present engine speed, and operates the respective actuators in accordance with the determined operation mode.

The operation mode of the engine 10 which is selected by the control device 50 includes a mode that performs an operation by lean combustion, and a mode that performs an operation by stoichiometric combustion. Furthermore, the mode that performs operation by lean combustion includes a mode that realizes lean combustion by port asynchronous injection, a mode that realizes lean combustion by port synchronous injection, and a mode that realizes lean combustion by cylinder injection. According to the port asynchronous injection and port synchronous injection, homogeneity of a mixture gas can be enhanced. When port asynchronous injection and port synchronous injection are compared, port asynchronous injection can enhance homogeneity more. According to cylinder injection, fuel is distributed in a stratified state into the mixture gas, and the fuel can be gathered around the ignition plug.

Figure 2:
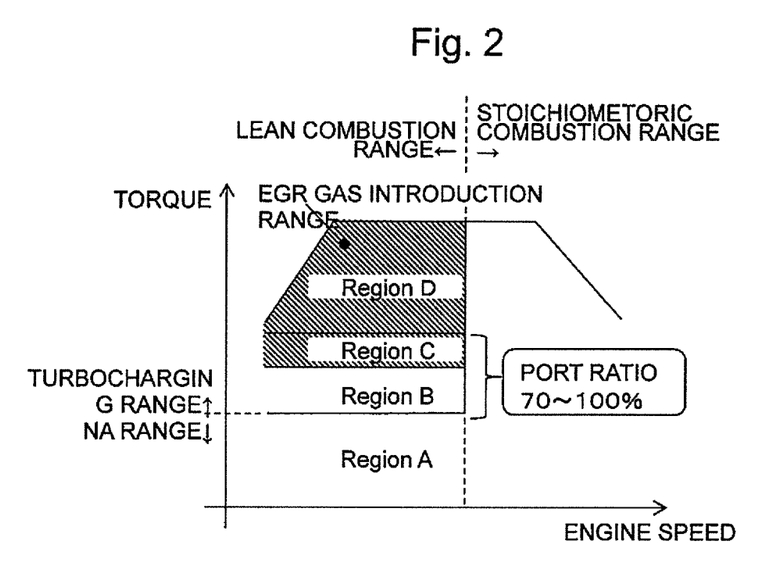
FIG. 2 is a diagram showing relations between operation modes, and torque and engine speeds of an internal combustion engine according to the first embodiment of the present invention.

FIG. 2 is a diagram showing relations of the operation modes of the engine 10 to be selected by the control device 50, and torque and an engine speed. As shown in the diagram, a range from a middle to high engine speed range through a high engine speed range is set as a stoichiometric combustion range in which an operation by stoichiometric combustion is performed, and a range from a low engine speed range through a low to middle engine speed range is set as a lean combustion range in which an operation by lean combustion is performed. Further, the lean combustion range is divided into a region A in which port asynchronous injection is performed, a region B in which port synchronous injection is performed, a region C in which port synchronous injection is performed and an EGR gas is introduced, and a region (a region D) in which cylinder injection is performed and the EGR gas is introduced, in sequence from a low torque side. In regions B and C, cylinder injection is additionally performed within a range in which homogeneity of the mixture gas can be assured, in order to prevent damage to and deterioration of the cylinder injection valve 22 by a high temperature. In order to assure homogeneity, it is necessary that a ratio of a fuel injection amount by port injection to a total fuel injection amount (a port ratio) is not below 70%. Accordingly, the port ratios in the regions B and C are set within a range of 70 to 100%.

When acceleration is performed from a low torque range in the lean combustion range, the operation mode of the engine 10 sequentially shifts to the region A, the region B, the region C and the region D. In the relation with the control method of the present disclosure, the region A corresponds to the first torque range, the regions B and C correspond to the second torque range, and the region D corresponds to the third torque range, respectively.

Figure 3:
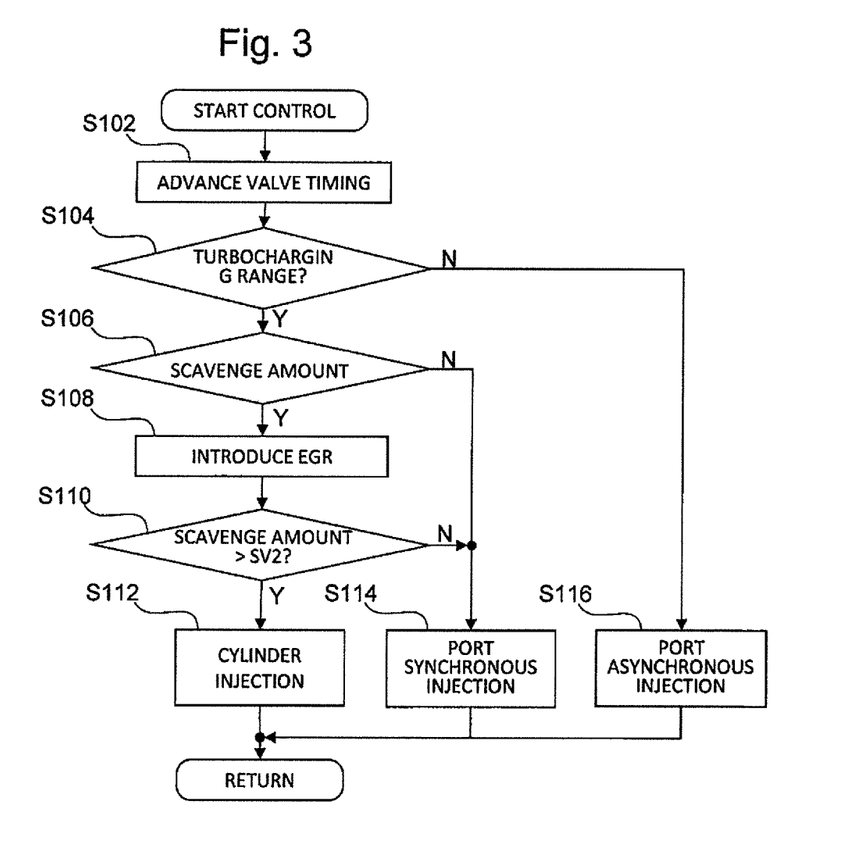
FIG. 3 is a flowchart showing a control method of the internal combustion engine according to the first embodiment of the present invention.

FIG. 3 is a flowchart showing a routine of engine control that is executed by the control device 50 when acceleration is performed from the low torque range in the lean combustion range. When request torque increases in a situation where the engine 10 is operated in the region A shown in FIG. 2, the present routine is executed by the control device 50. The present routine continues to be repeatedly executed at predetermined control periods while the request torque continues to increase, that is, while acceleration is continued. At a time point when increase of the request torque is ended, execution of the present routine is also ended.

In step S102, the control device 50 advances valve timing of the intake valve 14 by operating the variable intake valve mechanism 24 in order to enhance intake efficiency. An advance amount of the valve timing is set to correspond to a magnitude of the request torque. Advance of the valve timing of the intake valve 14 increases an overlap amount between the intake valve 14 and the exhaust valve 16.

Advance of the valve timing is performed concomitantly with intake air amount control by operations of the throttle valve 40 and the wastegate valve 46. In the low torque range, the control device 50 controls the intake air amount by the opening degree of the throttle valve 40 while fully opening the wastegate valve 46. When the throttle valve 40 is opened in response to an increase of the request torque, the throttle valve 40 opens to full opening and the intake pipe pressure reaches atmospheric pressure before long. After the throttle valve 40 reaches full opening, the control device 50 keeps the throttle valve 40 to be fully opened, and closes the wastegate valve 46 in response to an increase of the request torque. That is to say, in the turbocharging range, the control device 50 controls the intake air amount by an opening degree of the wastegate valve 46.

In step S104, the control device 50 determines whether or not the operation range of the engine 10 enters the turbocharging range based on a signal outputted from the intake pipe pressure sensor 56. When the operation range of the engine 10 is not in the turbocharging range, that is to say, when the intake pipe pressure is equal to or lower than the atmospheric pressure, scavenge does not occur, even if valve overlap occurs between the intake valve 14 and the exhaust valve 16. When the intake pipe pressure is higher than the atmospheric pressure, scavenge occurs by valve overlap, and a scavenge amount becomes large in accordance with a valve overlap amount.

When a determination result in step S104 is negative, that is, when the operation range of the engine 10 is still in a natural aspiration range (an NA range) (that is, when the operation range of the engine 10 is in the region A shown in FIG. 2), the control device 50 selects step S116 as a mode of fuel injection. In step S116, the control device 50 executes port asynchronous injection by the port injection valve 20, and realizes lean combustion by port asynchronous injection.

When the determination result in step S104 is affirmative, that is, when the operation range of the engine 10 enters the turbocharging range, the control device 50 performs determination in step S106 next. In step S106, the control device 50 estimates a scavenge amount based on the valve overlap amount, and determines whether or not the estimated scavenge amount is larger than a predetermined first reference value "SV1". A first reference value of the scavenge amount is a value lower than a second reference value "SV2" which will be described later, and is set in advance based on the second reference value.

When a determination result in step S106 is negative, that is, when the operation range of the engine 10 is a turbocharging range and is in a region where the scavenge amount is equal to or smaller than the first reference value (that is, when the operation range of the engine 10 is in the region B shown in FIG. 2), the control device 50 selects step S114 as the mode of fuel injection. In step 114, the control device 50 executes port synchronous injection by the port injection valve 20, and realizes lean combustion by port synchronous injection.

When the determination result in step S106 is affirmative, that is, when the operation range of the engine 10 is a turbocharging range, and is in a region where the scavenge amount is larger than the first reference value (that is, when the operation range of the engine 10 is in the region C shown in FIG. 2), the control device 50 executes processing in step S108. In step S108, the control device 50 operates the EGR valve 64 to introduce the EGR gas into the intake passage 30. A time delay is present until the EGR gas reaches the combustion chamber and the EGR gas amount in the combustion chamber sufficiently increases from a time point when the EGR valve 64 is opened. In particular, with a low pressure EGR device like the EGR device 60 of the present embodiment, a capacity from an introduction port for the EGR gas to the combustion chamber is larger as compared with a high pressure EGR device that connects an upstream side of the turbine and a downstream side of the compressor, and therefore, the above described time delay also becomes large. The above described first reference value is set so that an estimated time period until the scavenge amount increases to the second reference value from the first reference value corresponds to the above described time delay. In the region A and the region B, the EGR valve 64 is closed, and introduction of the EGR gas into the intake passage 30 is not performed.

The control device 50 performs determination in step S110 next. In step S110, the control device 50 determines whether the scavenge amount which is estimated based on the valve overlap amount is larger than the predetermined second reference value "SV2". When port injection is executed, the amount of the fuel which flows into the exhaust port increases as the scavenge amount becomes larger. With this, the fuel efficiency performance reduces, but the emission performance is influenced by activation states of the three-way catalyst 70 and the NOx purifying catalyst 72. Therefore, the second reference value of the scavenge amount is determined with use of an exhaust gas temperature which influences activation of the catalysts 70 and 72 as one parameter.

When a determination result in step S110 is negative, that is, when the operation range of the engine 10 is the turbocharging range, but is in the region where the scavenge amount is equal to or smaller than the second reference value (that is, when the operation range of the engine 10 is in the region C shown in FIG. 2), the control device 50 executes processing in step S114. That is to say, the control device 50 continues lean combustion by port synchronous injection while introducing the EGR gas. An EGR rate of the gas in the combustion chamber increases in response to the number of cycles that elapse from start of introduction of the EGR gas, and reaches an EGR rate set as a target before long. Further, in the region C which is the middle to high load range, the cylinder injection valve 22 is exposed to a thermally severe environment by increase of the temperature in the combustion chamber. Therefore, the control device 50 injects part of the fuel from the cylinder injection valve 22, and the tip end of the cylinder injection valve 22 is cooled by the relatively low temperature fuel.

When the determination result in step S110 is affirmative, that is, when the operation range of the engine 10 is the turbocharging range, and is in a region where the scavenge amount is larger than the second reference value (that is, when the operation range of the engine 10 is in the region D shown in FIG. 2), the control device 50 selects step S112 as a mode of fuel injection. In step S112, the control device 50 stops port synchronous injection by the port injection valve 20, and realizes lean combustion by cylinder injection by the cylinder injection valve 22.

By repeatedly executing the aforementioned routine, the mode of lean combustion is sequentially switched from lean combustion by port asynchronous injection to lean combustion by port synchronous injection, and to lean combustion by cylinder injection.

Figure 4:
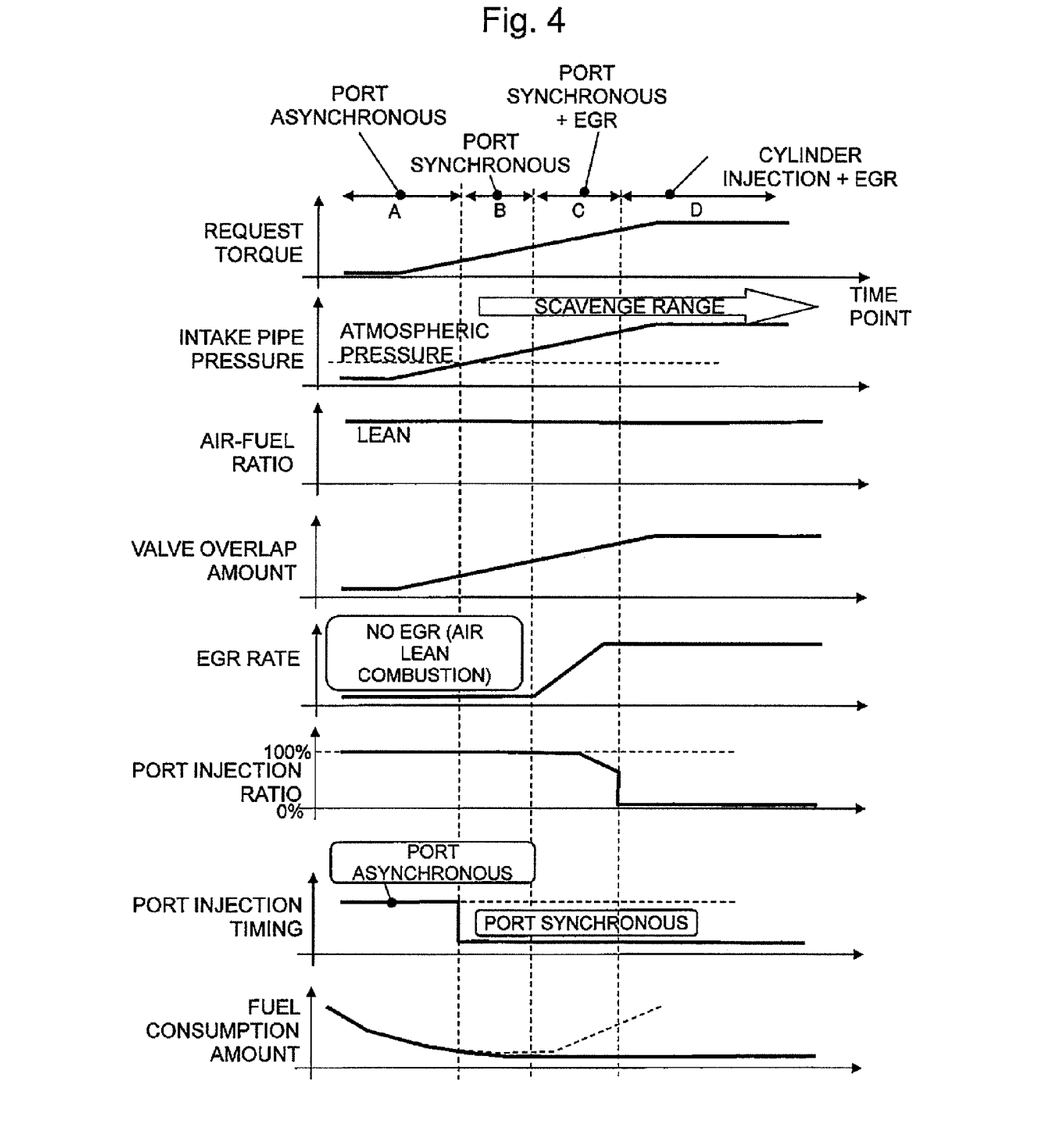
FIG. 4 is a timing chart showing the control method of an internal combustion engine according to the first embodiment of the present invention.

FIG. 4 is a diagram showing a content of engine control executed by the control device 50 in a time chart. Hereinafter, the content of the engine control according to the present embodiment will be described specifically with reference to the time chart, and an operation and an effect thereof will be described in combination.

The time chart shown in FIG. 4 shows respective temporal changes of request torque, an intake pipe pressure, an air-fuel ratio, a valve overlap amount, an EGR rate, a port injection ratio, port injection timing, and a fuel consumption amount, from the top. The time chart starts from a situation where the operation range of the engine 10 is in the region A. In the region A, fuel injection is performed by using only the port injection valve 20, and injection timing of the port injection valve 20 is set at a time while the intake valve 14 is closed. That is to say, port asynchronous injection by the port injection valve 20 is performed. The air-fuel ratio which is set is an air-fuel ratio (for example, an air-fuel ratio of around 24) with leaner fuel than stoichiometry, and a lean combustion operation is performed by port asynchronous injection. Further, in the region A, the EGR gas is not introduced, and lean combustion (air lean combustion) by only air is performed.

When an operator depresses an accelerator pedal, and the request torque that is calculated from an accelerator opening degree increases, the throttle valve 40 is opened in response to it, whereby the intake pipe pressure increases. Further, the valve timing of the intake valve 14 is advanced in response to increase of the request torque, whereby the valve overlap amount also increases. The valve overlap amount has a positive larger value as overlap of an opening time period of the intake valve 14 and an opening time period of the exhaust valve 16 is larger, and becomes a negative larger value as the opening time period of the intake valve 14 does not overlap the opening time period of the exhaust valve 16, and a time period until the intake valve 14 opens after the exhaust valve 16 is closed is longer. Control of the valve timing of the intake valve 14 is performed so that the valve overlap amount becomes a positive value when the operation range of the engine 10 enters the turbocharging range at the latest, though a minimum value of the valve overlap amount in the region A may be a negative value.

In response to increase of the request torque, the intake pipe pressure reaches the atmospheric pressure before long, and the operation range of the engine 10 enters the region B. In response to the intake pipe pressure reaching the atmospheric pressure, the injection timing of the port injection valve 20 is delayed, and part of the fuel is injected after the intake valve 14 is opened. That is to say, fuel injection is switched to port synchronous injection from the port asynchronous injection. In the region B, a lean combustion operation is performed by the port synchronous injection. While port injection is performed, port-wet which is not generated in cylinder injection is generated. However, by switching the fuel injection to the port synchronous injection from the port asynchronous injection, the amount of the port-wet can be reduced before switch to the cylinder injection is performed.

The valve overlap amount also increases in response to increase of the request torque, and with this, the scavenge amount also increases. Before long, the scavenge amount which is estimated from the valve overlap amount becomes larger than the first reference value, and the operation range of the engine 10 enters the region C. In response to this, introduction of the EGR gas into the intake passage 30 is started. The EGR rate in the cylinders gradually increases, and reaches the EGR rate which is set as the target before long. Lean combustion by port synchronous injection is inferior in homogeneity of the mixture gas as compared with lean combustion by port asynchronous injection. However, the combustion temperature is lowered by introduction of the EGR gas, and therefore generation of NOx is restrained even if the air-fuel ratio becomes locally rich.

Further, when the operation range of the engine 10 is in the region C, the ratio of fuel injection by cylinder injection is gradually increased in response to increase of the request torque, from a time point when the request torque exceeds a predetermined value. This is for the purpose of protecting the cylinder injection valve 22 from heat by cooling the tip end of the cylinder injection valve 22 by the fuel having a relatively low temperature. Thereby, the ratio of the port injection is gradually reduced to approximately 70% from 100%. If the port injection ratio is further reduced, the homogeneity of the mixture gas becomes difficult to assure, but if the port injection ratio is approximately 70%, the homogeneity can be assured.

When the scavenge amount which is estimated from the valve overlap amount becomes larger than the second reference value due to further increase of the request torque, the operation range of the engine 10 enters the region D. In response to this, the port synchronous injection by the port injection valve 20 is stopped. That is to say, the port injection ratio is made 0%, all of the fuel is injected by cylinder injection by the cylinder injection valve 22, and lean combustion operation by the cylinder injection is performed. In a horizontal column representing the fuel consumption amount in the time chart, the solid line and the broken line are drawn. The solid line represents the fuel consumption amount according to the present control method, and the broken line represents a fuel consumption amount in the case of continuing the port synchronous injection. When the port synchronous injection is continued in the region D, the fuel consumption amount increases and the fuel efficiency performance is worsened because the fuel blows to the exhaust port by scavenge. Further, since unburned fuel flows into the exhaust port, worsening of emission performance is also feared. However, according to the present method, blow-by of the fuel by scavenge can be prevented by cylinder injection, and therefore, fuel efficiency performance and emission performance can be kept favorable.

Further, at the time of switch to cylinder injection from port injection, fluctuation of the air-fuel ratio due to the difference in the adhering amount of port-wet is feared. However, in the present control method, the fuel injection is switched to port synchronous injection with a small amount of port-wet from port asynchronous injection, where the port-wet is sufficiently reduced, and thereafter the combustion is switched to lean combustion by cylinder injection. Therefore, fluctuation of the air-fuel ratio immediately after switch to the cylinder injection is restrained. Further, even if the air-fuel ratio becomes richer than the set air-fuel ratio transitionally by the influence of the port-wet, a sufficient amount of EGR gas is already introduced into the combustion chamber at this point of time, and therefore generation of NOx accompanying fluctuation of the air-fuel ratio is restrained.

As described above, according to the present embodiment, in the engine 10 including the turbocharger 28, an operation by lean combustion can be performed while both emission performance and fuel efficiency performance are kept favorable, in the wide operation range from the low torque range to the high torque range.

Second Embodiment

Next, a second embodiment of the present invention will be described with use of the drawings.

In the present embodiment, a control device takes a natural aspiration type engine as a control target. The engine according to the present embodiment includes port injection valves and cylinder injection valves, and also includes an EGR device, though not illustrated.

Figure 5:
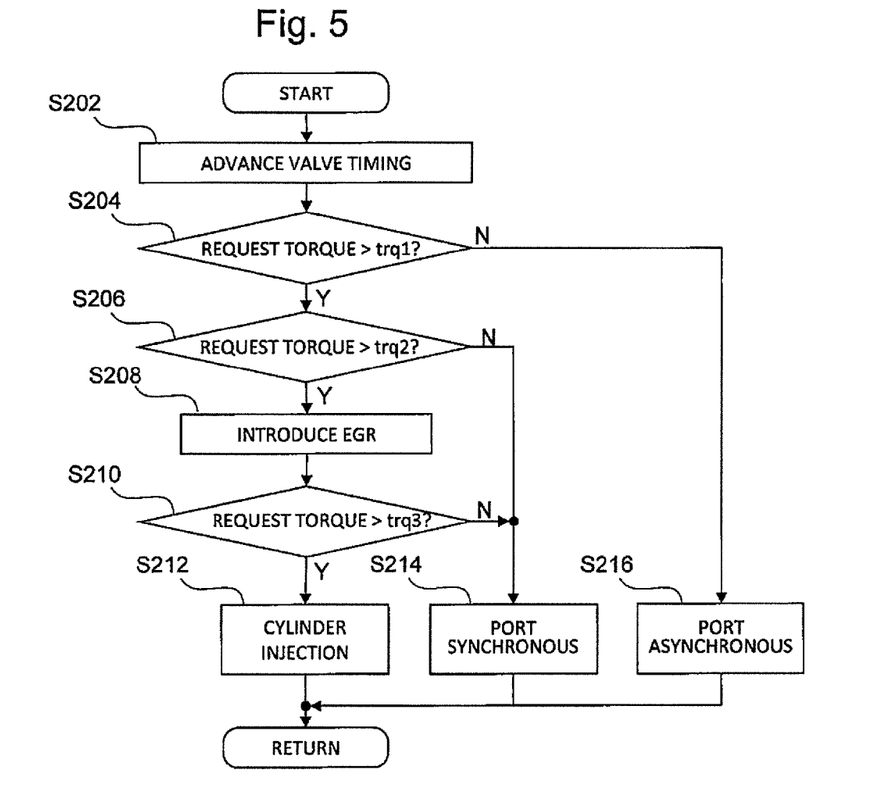
FIG. 5 is a flowchart showing a control method of an internal combustion engine according to a second embodiment of the present invention.

FIG. 5 is a flowchart showing a routine of engine control which is executed by the control device according to the present embodiment when acceleration is performed from a low torque range in a lean combustion range. The present routine is continued to be repeatedly executed at predetermined control periods while request torque keeps increasing, that is, while acceleration is continued. At a time point when increase of the request torque is ended, execution of the present routine is also ended.

In step S202, the control device advances valve timing of the intake valve in order to enhance intake efficiency. An advance amount of the valve timing is set in accordance with a magnitude of the request torque. In the engine according to the present embodiment, control of an intake air amount is performed according to an opening degree of a throttle valve in all torque ranges.

In step S204, the control device determines whether the request torque becomes larger than a first reference torque "trq1". In a relation with the control method of the present disclosure, a torque range which is lower than the first reference torque corresponds to a first torque range.

When a determination result in step S204 is negative, that is, when the request torque is equal to or smaller than the first reference torque, the control device selects step S216 as a mode of fuel injection. In step S216, the control device executes port asynchronous injection by the port injection valve, and realizes lean combustion by port asynchronous injection.

When the determination result in step S204 is affirmative, that is, when the request torque is larger than the first reference torque, the control device performs determination in step S206 next. In step S206, the control device determines whether the request torque is larger than a second reference torque "trq2". The second reference torque is set at a value that is larger than the first reference torque.

When a determination result in step S206 is negative, that is, when the request torque is equal to or smaller than the second reference torque, the control device selects step S214 as the mode of fuel injection. In step S214, the control device executes port synchronous injection by the port injection valve, and realizes lean combustion by the port synchronous injection.

When the determination result in step S206 is affirmative, that is, when the request torque is larger than the second reference torque, the control device executes processing in step S208. In step S208, the control device introduces an EGR gas into the intake passage by operating the EGR device. In the engine according to the present embodiment, the EGR passage connects an intake passage at a downstream side from a throttle valve and an exhaust passage at an upstream side from a catalyst. In the present embodiment, a time delay is also present until an EGR gas amount in the combustion chamber sufficiently increases from a time point when an EGR valve is opened. The above described second reference torque is set so that an estimated time period until the request torque increases to a third reference torque that will be described later from the second reference torque corresponds to the above described time delay.

The control device performs determination in step S210 next. In step S210, the control device determines whether the request torque is larger than a third reference torque "trq3". The third reference torque is set at a value that is larger than the second reference torque. In a relation with the control method of the present disclosure, a torque range from equal to or larger than the first reference torque to smaller than the third reference torque corresponds to a second torque range, and a torque range equal to or larger than the third reference torque corresponds to the third torque range.

When a determination result in step S210 is negative, that is, when the request torque is equal to or smaller than the third reference torque, the control device executes processing in step S214, and continues lean combustion by the port synchronous injection while introducing the EGR gas. The EGR rate of the gas in the combustion chamber increases in response to the number of cycles that elapse from the start of introduction of the EGR gas, and reaches an EGR rate that is a target before long. In the present embodiment, part of the fuel may be also injected from the cylinder injection valve, and a tip end of the cylinder injection valve may be also cooled by the fuel, if the combustion temperature by lean combustion becomes so high as to exert an adverse influence on the cylinder injection valve.

When the determination result in step S210 is affirmative, that is, when the request torque is larger than the third reference torque, the control device selects step S212 as the mode of fuel injection. In step S212, the control device stops port synchronous injection by the port injection valve, and realizes lean combustion by cylinder injection by the cylinder injection valve. In the high torque range, scavenge sometimes occurs even in the natural aspiration type engine as in the present embodiment, and according to the cylinder injection, outflow of the unburned fuel to the exhaust port by scavenge can be prevented. Further, in the high torque range, the combustion temperature rises, but according to the cylinder injection, the fuel can be vaporized in the combustion chamber, and therefore, the combustion temperature can be restrained to be equal to or lower than an allowable temperature by the cooling effect by latent heat of vaporization.

The third reference torque to be the reference of switch to the cylinder injection from the port synchronous injection is set at an upper limit value of a torque range in which occurrence of no scavenge is assured. However, when the upper limit value is higher than a lower limit value of a torque range in which unless cylinder injection is performed, the combustion temperature cannot be restrained to be equal to or lower than an allowable temperature, the lower limit value may be set at the third reference torque. Further, the second reference torque to be the reference of switch to the port synchronous injection from the port asynchronous injection is determined based on the third reference torque so that a time period in which port-wet can be sufficiently reduced can be ensured before fuel injection is switched to the cylinder injection.

By repeatedly executing the aforementioned routine, the mode of the lean combustion is sequentially switched to lean combustion by port synchronous injection, and to lean combustion by cylinder injection, from lean combustion by port asynchronous injection.

Figure 6:
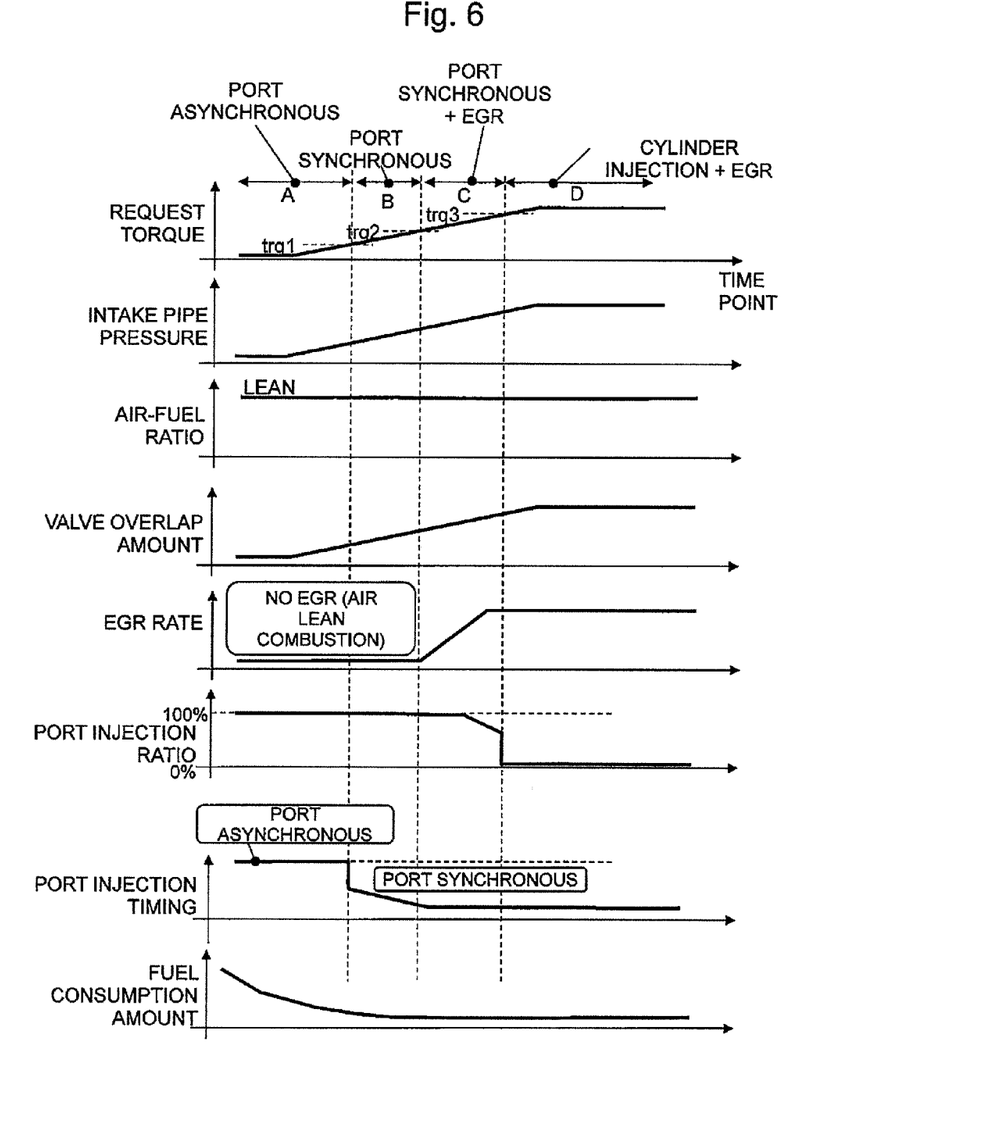
FIG. 6 is a timing chart showing the control method of an internal combustion engine according to the second embodiment of the present invention.

FIG. 6 is a diagram expressing a content of the engine control which is executed by the control device according to the present embodiment in a time chart. Hereinafter, the content of the engine control according to the present embodiment will be specifically described with reference to the time chart, and an operation and an effect thereof will be described in combination.

The time chart shown in FIG. 6 shows respective temporal changes of request torque, intake pipe pressure, an air-fuel ratio, a valve overlap amount, an EGR rate, a port injection ratio, port injection timing, and a fuel consumption amount, from the top. The time chart starts from a situation where the operation range of the engine is in the region A. In the region A, a lean combustion operation is performed by port asynchronous injection using the port injection valve. Further, in the region A, the EGR gas is not introduced, and lean combustion (air lean combustion) by only air is performed.

When an operator depresses an accelerator pedal, and the request torque that is calculated from an accelerator opening degree increases, the throttle valve is opened in response to it, whereby intake pipe pressure increases. Further, the valve timing of the intake valve is advanced in response to increase of the request torque, whereby the valve overlap amount also increases.

When the request torque exceeds the first reference torque "trq1", the operation range of the engine enters the region B, and injection is switched to port synchronous injection from port asynchronous injection. In the region B, a lean combustion operation is performed by port synchronous injection. By switching the fuel injection to the port synchronous injection from the port asynchronous injection, the amount of port-wet can be reduced before switch to cylinder injection is performed.

Further, as expressed in the chart of the port injection time period, the injection timing of the port injection valve may be controlled to delay more as the request torque becomes larger, after fuel injection is switched to the port synchronous injection from the port asynchronous injection. That is to say, in response to increase of the request torque, the time period of the fuel injection which is performed while the intake valve is closed may be decreased, and the time period of fuel injection that is performed while the intake valve is opened may be increased. By performing control like this, port-wet can be gradually decreased even after the fuel injection is switched to the port synchronous injection from the port asynchronous injection. The control is also applicable to embodiment 1.

When the request torque further increases and exceeds the second reference torque "trq2", the operation range of the engine enters the region C. In response to this, introduction of the EGR gas into the intake passage is started. Port synchronous injection is inferior in homogeneity of the mixture gas as compared with port asynchronous injection, but by introduction of the EGR gas, generation of NOx is restrained even if the air-fuel ratio becomes locally rich. The EGR rate in the cylinders gradually increases, and reaches the EGR rate which is set as the target before long.

Further, in the present embodiment, when the operation range of the engine 10 is in the region C, the ratio of the fuel injection by cylinder injection is gradually increased in response to increase of the request torque, from a time point when the request torque exceeds a predetermined value, and the ratio of port injection may be gradually reduced from 100% to approximately 70% that can assure homogeneity of the mixture gas.

When the request torque further increases and exceeds the third reference torque "trq3", the operation range of the engine enters the region D. In response to this, the port synchronous injection by the port injection valve is stopped, and all of the fuel is injected by cylinder injection by the cylinder injection valve, and a lean combustion operation by the cylinder injection is performed. When the port synchronous injection is continued in the region D, the fuel also blows to the exhaust port by scavenge in some cases, in the natural aspiration type engine as in the present embodiment. However, according to the present control method, blow-by of the fuel by scavenge can be prevented by cylinder injection, and therefore, fuel efficiency performance and emission performance can be kept favorable.

According to the present embodiment an operation by lean combustion can be performed while both emission performance and fuel efficiency performance are kept favorable in a wide operation range from the low torque range to the high torque range, in the natural aspiration type engine.

Other Embodiments

The present disclosure is not limited to the aforementioned embodiments, and can be carried out by being variously modified within the range without departing from the spirit of the present disclosure. For example, introduction of the EGR gas is started in the time period in which port synchronous injection is performed, but introduction of the EGR gas is not essential. The present disclosure can be also applied to control of an internal combustion engine which does not include the EGR device. Further, it is not essential to increase the ratio of cylinder injection gradually when port synchronous injection is performed. When there is a margin between the allowable temperature of the cylinder injection valve and the combustion temperature, cylinder injection does not have to be performed. Conversely, cylinder injection can be also added at the time of execution of port asynchronous injection, if it is within the range in which homogeneity of the mixture gas can be assured.

The invention claimed is:

1. A control method of an internal combustion engine that causes an internal combustion engine including a port injection valve that injects fuel into an intake port and a cylinder injection valve that directly injects fuel into a combustion chamber to selectively execute port asynchronous injection that starts fuel injection by the port injection valve while an intake valve is closed and ends the fuel injection by the port injection valve before the intake valve opens, port synchronous injection that starts fuel injection by the port injection valve while the intake valve is closed and ends the fuel injection by the port injection valve while the intake valve opens, and cylinder injection that performs fuel injection by the cylinder injection valve,
wherein when request torque to the internal combustion engine is in a first torque range, lean combustion in which fuel is leaner than stoichiometric combustion is realized by the port asynchronous injection,
when the request torque increases from the first torque range to a second torque range that is higher than the first torque range, fuel injection is switched to the port synchronous injection from the port asynchronous injection, and lean combustion is realized by the port synchronous injection, and
when the request torque increases from the second torque range to a third torque range that is higher than the second torque range, the port synchronous injection is stopped, and lean combustion is realized by the cylinder injection.

2. The control method of an internal combustion engine according to claim 1,
wherein the internal combustion engine is an internal combustion engine equipped with an EGR device that recirculates part of an exhaust gas from an exhaust passage to an intake passage as an EGR gas, and
while lean combustion is realized by the port synchronous injection, introduction of the EGR gas to the intake passage by the EGR device is started, and while lean combustion is realized by the cylinder injection, introduction of the EGR gas is continued.

3. The control method of an internal combustion engine according to claim 1,
wherein the internal combustion engine is an internal combustion engine equipped with a turbocharger, and
a region where an intake pipe pressure of the internal combustion engine is equal to or lower than atmospheric pressure is defined as the first torque range, a region where the intake pipe pressure is higher than the atmospheric pressure is defined as the second torque range, and in response to the intake pipe pressure becoming higher than the atmospheric pressure with increase of the request torque, fuel injection is switched to the port synchronous injection from the port asynchronous injection, and lean combustion is realized by the port synchronous injection.

4. The control method of an internal combustion engine according to claim 3,
wherein valve timing of the intake valve is advanced in response to increase of the request torque, and with this, an overlap amount between the intake valve and the exhaust valve is increased, and
a region in which a scavenge amount that is estimated based on the overlap amount is equal to or smaller than a predetermined reference value is defined as the second torque range, a region in which the scavenge amount is larger than the reference value is defined as the third torque range, and in response to the scavenge amount becoming larger than the reference value with increase of the request torque, the port synchronous injection is stopped and lean combustion is realized by the cylinder injection.

5. The control method of an internal combustion engine according to claim 1,
wherein in a step of realizing lean combustion by the port synchronous injection, a time period of the fuel injection by the port injection valve which is performed while the intake valve is closed is decreased in response to increase of the request torque, and a time period of the fuel injection by the port injection valve which is performed while the intake valve opens is increased.

6. The control method of an internal combustion engine according to claim 1,
wherein in a step of realizing lean combustion by the port synchronous injection, a ratio of the fuel injection by the cylinder injection is gradually increased within a predetermined range in response to increase of the request torque.

* * * * *